United States Patent [19]

Jau

[11] Patent Number: 4,795,296

[45] Date of Patent: Jan. 3, 1989

[54] HAND-HELD ROBOT END EFFECTOR CONTROLLER HAVING MOVEMENT AND FORCE CONTROL

[75] Inventor: Bruno M. Jau, Los Angeles, Calif.

[73] Assignee: California Institute of Technology, Pasadena, Calif.

[21] Appl. No.: 931,269

[22] Filed: Nov. 17, 1986

[51] Int. Cl.⁴ .............................. B25J 3/00; B25J 3/04
[52] U.S. Cl. .......................................... 414/5; 74/491; 74/523; 244/223; 414/6; 901/34
[58] Field of Search ........................... 414/1, 2, 4, 5, 6; 74/523, 491; 244/223, 228, 234, 236; 901/33, 34

[56] References Cited

U.S. PATENT DOCUMENTS

| | | | |
|---|---|---|---|
| 3,168,203 | 2/1965 | Gallistel | 414/5 |
| 3,171,549 | 3/1965 | Orloff | 901/34 X |
| 3,241,687 | 3/1966 | Orloff | 414/5 |
| 3,449,008 | 6/1969 | Colechia | 901/34 X |
| 3,618,786 | 11/1971 | Fick | 414/5 |
| 3,620,095 | 11/1971 | Dane | 901/34 X |
| 3,637,092 | 1/1972 | George et al. | 901/22 X |
| 3,771,037 | 11/1973 | Bailey, Jr. | 244/237 |
| 4,531,080 | 7/1985 | Nordström et al. | 244/236 X |

FOREIGN PATENT DOCUMENTS

| | | | |
|---|---|---|---|
| 408797 | 12/1970 | Australia . | |
| 234763 | 5/1969 | U.S.S.R. . | |
| 234762 | 5/1969 | U.S.S.R. . | |
| 524686 | 11/1976 | U.S.S.R. | 901/34 |

OTHER PUBLICATIONS

"Remote Manipulator with Force Feedback"—Ames Res. Centr.—*NASA Tech Briefs*—Fall '80, pp. 373–374.

*Primary Examiner*—Robert J. Spar
*Assistant Examiner*—P. McCoy Smith
*Attorney, Agent, or Firm*—Jackon & Jones

[57] ABSTRACT

A hand-held controller for a robot end effector having force and position control is disclosed. A single tactile area of the operator's hand, such as one finger, responds to two distinct feedback "feels" which are created by movement of a single element in two degrees of freedom that are both pivotable and rotatable in nature. Rotation of the trigger contacting element about its longitudinal axis is responsive to and reflects the amount of grasp force exerted by the end effector. Deflection of a guard encasing that trigger around a pivot point is responsive to and reflects the amount of movement of the end effector. The operator controls the position and grasp force of an end effector by exerting pressure against the trigger guard and, in turn, can "feel" two distinct feedbacks at the control finger. The feedback is indicative of both the grasp force and position of the controlled end effector. The trigger and its guard both pivot as a single unit in order to reflect position feedback, whereas the trigger within the guard rotates to reflect grasp force feedback.

6 Claims, 2 Drawing Sheets

HAND-HELD ROBOT END EFFECTOR CONTROLLER HAVING MOVEMENT AND FORCE CONTROL

BACKGROUND OF THE INVENTION

1. Origin of the Invention

The invention described herein was made in the performance of work under a NASA contract, and is subject to the provisions of Public Law 96-517 (35 USC 202) in which the Contractor has elected to retain title.

2. Field of the Invention

This invention relates to hand-held controllers and, more particularly, to a hand-held controller for robot end effectors, which controller provides force and position feedback to the operator.

2. Background of the Invention

Joystick, pistol-grip and other type hand-held controllers are well known. The controllers move an end effector in a direction that corresponds to the pivoted direction that the controller is moved. To add "feel" for the user, it is known to add resistance of various types to the controller.

A known feel-creating means for a joystick control is described in U.S. Pat. No. 3,771,037 to Bailey Jr., wherein a resilient bias means 24 is depicted in FIGS. 2, 3 and 6 and is described at column 4 lines 28 through 50. Other joystick or pistol-grip controllers are depicted in George et al, U.S. Pat. No. 3,637,092, wherein force feedback is presented at handle 45, and in Fick, U.S. Pat. No. 3,618,786, wherein a piston and cylinder assembly 25, 26 or 27, FIG. 1, provide "feel". In each of these patent disclosures the feedback of applied force is reflected as a resistance to movement at the hand-held controller.

Another type of controller encloses the operator's hand and provides signals at the hand to supply a "feel" that an action has taken place. Typical of this type is an Australian Patent No. 408,797 disclosing a bladder 47 which is located within a glove 11 that is worn by the operator. The bladder 47 is inflated to impart a feedback resistance force to the finger of the operator. A similar type system is disclosed in two Russian Pat. Nos. 234,762 and 234,763 wherein an openable case 3 has an inner surface that loosely embraces an operator's hand. In each one of these Russian patents, the case is movable to impart motion to an end effector. A handle is located within the opening in each case. In the '763 patent, the handle houses vibrators which cause a sensation on the palm of the operator's hand. In the two Russian patents, the operator's thumb and index finger fit within rings which drive a gripping mechanism, and also receive feedback signals at sensation-creating vibrators, or pushers, located at the tips of each ring.

In summary, then, it is known to provide control by a hand-held device, and to equip that device with some type of feedback resistance as an indication of a force applied at a controlled object. In other instances a vibration, such as the vibrators in the Russian patents, indicates that an action has taken place.

For sophisticated control over a robot end effector, it is a feature of this invention to provide a single tactile area with simultaneous feedback of both force and movement.

SUMMARY OF THE INVENTION

Briefly the subject invention comprises a hand held controller of the pistol grip type for controlling a robot end effector and providing force and position feedback to a single tactile area of the operator's hand. In the preferred embodiment the single tactile area is located at the forward end of the operator's index finger. The operator's finger fits within a finger receiving trigger guard. The guard has a forward part surrounding and generally conforming to the operator's outer portion of his index finger and a rearwardly-located trigger held within the guard, with the trigger including an index finger contact piece which is adapted to fit against and generally conforms to the underside of the operator's index finger. The operator controls both the position or movement and grasp force of an end effector. Exerting pressure against the trigger inwardly toward the palm of the operator's hand, controls the closing motion and clamping force of the end effector. Pushing outwardly against the guard and away from the palm reverses the command operations. During feedback the operator can "feel" two distinct feedbacks at the end of his finger. The trigger element adapted for contact with an operator's finger, according to this invention, is both pivotable and rotatable in response to feedback signals from the controlled end effector. Rotation of the trigger element about its longitudinal axis is responsive to and reflects the amount of grasp force that has been exerted by the end effector. Deflection of the guard encasing that trigger around a pivot point is felt by the controlling finger as an in-and-out motion that is responsive to and reflects the amount of movement the end effector has achieved.

In this invention, responsive to feedback signals, the trigger and its guard both pivot as a single unit inwardly (toward the palm) or outwardly (away from the palm) in order to reflect position, whereas the trigger within the guard is free to rotate relative to the rest of the trigger-guard unit. The trigger contact piece has a concave cylindrical section to better fit the operator's finger. The flat curved portion has a definite width, which width, when it is rotated causes a distinct "feel" to the underside of the operator's index finger. Rotation of the trigger supplies a distinct and varying pressure by the trigger's cylindrical surface bearing on the inside of the operator's finger. The amount and direction of the rotationally induced pressure is felt as a sensation on the operator's index finger, and is indicative of the grasping force exerted by the controlled end effector.

DETAILED DESCRIPTION OF THE DRAWINGS

Figure 1:
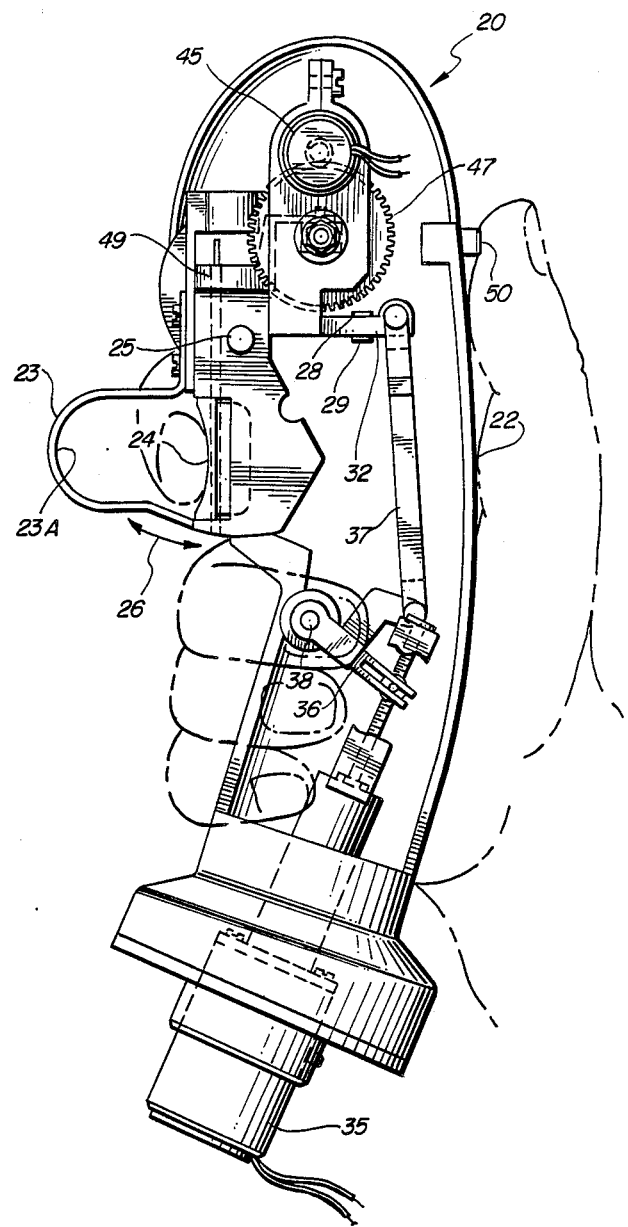
FIG. 1 is a cross-sectional side elevation of the dual force controller of this invention.

FIG. 1 depicts a side elevation of controller 20 which may advantageously take the general shape of a pistol grip or joystick control for an operator's hand. Controller 20 includes an appropriately shaped handle 22 having, in the foremost position thereof, a trigger guard, or housing, 23 and trigger 24. Trigger housing 23 is pivoted at point 25 so that force by an operator's finger on trigger 24 or the inner area 23A of guard 23 tends to move the housing 23 as shown by the double-headed arrow 26.

Pivotable force that tends to promote pressure applied at guard 23 about pivot point 25, induces strain in a pair of strain guages 28, 29 located on opposed surfaces of linkage 32. That strain, in a well-known manner, is reflected in signals of opposite polarity depending upon the direction of applied force by the operator's fingers. For example, if the operator's finger pressure is such that the guard 23 tends to be moved inwardly toward the palm, then guage 28 is in tension whereas guage 29 is in compression and a motor command signal of one polarity results. Conversely, a force tending toward movement of guard 23 away from the palm results in the opposite conditions at guages 28, 29 and a signal of opposite polarity is developed.

To control the end effector motion—such as the movement of a claw—the operator exerts force on the trigger 24 with his finger or the operator pushes outwards against the trigger guard surface 23A for a reverse motion. Strain guages 28, 29 measure this force and translate it into electrical signals which regulate an end effector motor. Thus, the controlled position of a claw is proportional to the trigger force applied by the operator. Once the controlled claw has moved into contact with an object to be controlled, the claw movement stops but continued finger force still produces command signals and the end effector continues to receive motor control current. Continuation of that current then controls grasp force by the claw. Various control systems responsive to this operator-induced force are well-known and need no further description. Suffice it to say that force tending to result in pivoting of guard 23 in the directions of arrow 26 controls claw position and grasping force.

Figure 2:
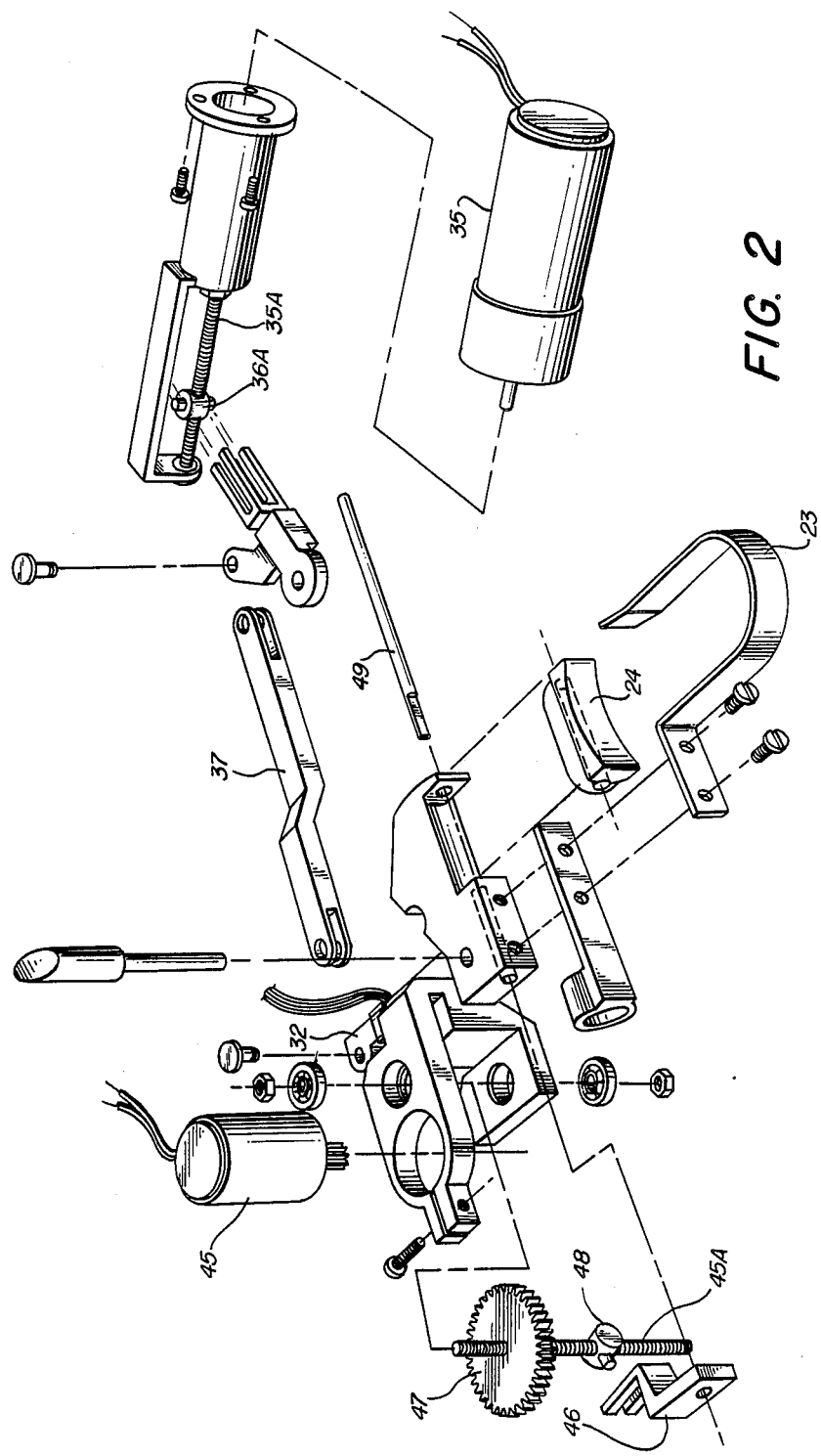
FIG. 2 is an exploded perspective view of the interior parts within the handle of FIG. 1.

A position, or movement, feedback servomotor 35 of any well-known type is located at the base of the handgrip 22. Motor 35 receives position feedback signals from a controlled end effector in a well-known manner. Motor 35 operates through a spindle 36 and linkage mechanism 37 to rotate the guard 23/trigger 24 back and forth in the direction of arrow 26. As shown in exploded view in FIG. 2, motor 35 drives a threaded post 35A upon which is mounted a traveling nut 36A. Nut 36A moves up and down on post 35A depending upon the direction of rotation of motor 35. As nut 36A travels, it pivots linkage 36 about the pivot point 38. A link 37 moves up and down within handle 22 and that movement of link 37 pivots trigger housing 23, via linkage 32, in the directions of arrow 26.

The trigger 24, relative to guard 23, does not yield responsive to the operator's squeezing force. Instead it will receive feedback and will be rotated by such feedback as is caused by and is responsive to claw pressure. Located at the top of handle 22 is another servomotor 45 which motor responds to signals generated on the claw by transducers or equivalents in any well known manner. Motor 45 receives signals which are proportional to the amount of grasping force being applied at the claw of the end effector. Motor 45 drives a translational linkage member 46 through a directional change gear 47. Gear 47 is fixed upon a threaded post 45A which houses a traveling nut 46A. As nut 46A moves, link 46 pivots a shaft 49. Shaft 49 is fixably attached to trigger 24. Trigger 24 rotates as shaft 49 rotates in response to the drive signals applied to servomotor 45.

FIG. 4 is an exploded view taken of FIG. 1. A flat curved surface is clearly shown at the finger touch area of trigger 24. The operator's finger can readily feel the change in rotation of the flat surface of trigger 24. For example, in response to one polarity of feedback signal, trigger 24 rotates clockwise, whereas trigger 24 rotates counter clockwise in response to a feedback signal, of opposite polarity. The magnitudes of the feedback signal controls the amount of clockwise or counterclockwise rotation that occurs. These feedback signals directly indicate the grasping force at the end effector and that force is positively felt at the operator's trigger finger.

This controller provides simple control actuation for claw control and provides easily understood feedback functions, all presented at the operator's finger. Other fingers of the operator's hand are free to execute other control functions. For instance, the thumb may manipulate strategically located buttons such as button 50, FIG. 1, at the back of the handle 22. Moreover, the manipulations through the operator's finger do not require eye contact, so that the operator can devote attention to monitoring other functions. The controller thus lends itself well for integration into a robot arm master controller.

The above description present the best mode contemplated in carrying out my invention. My invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A hand-held controller of the pistol-grip type with a trigger element in a trigger guard housing adapted for contact with a single finger of an operator's controlling hand, said trigger element in said housing being capable of two-degrees-of-freedom movement in response to feedback control signals applied thereto, wherein feedback-induced movement at said trigger element reflects at least a pair of controlled parameters at a unit that is being controlled by said hand-held controller, said controller comprising:

a finger-sized opening in said housing adapted to receive an operator's finger with the inner surface of the finger in contact with said trigger element and the outer surface of the finger in contact with a trigger guard portion of said housing so that inward or outward movement of that finger develops an inward or an outward force on said housing;

means responsive to the inward or outward force developed by the operator's finger on said trigger element or on said guard portion, respectively, for creating control signals to be emitted from said controller;

means responsive to a first electrical feedback signal for controlling one degree of movement of said trigger element, which movement can be sensed by said single finger of said operator's hand, said one degree of movement comprising movement in unison of said housing and trigger element; and means responsive to a second feedback signal for controlling the other degree of movement of said trigger element within said housing, which other movement can also be sensed separately from said first-degree-of-freedom movement by the same finger of said operator's hand, said other degree of movement comprising rotation or pivoting of the trigger element independent of the housing.

2. A hand-held controller in accordance with claim 1 wherein said trigger element further comprises a trigger contact piece located within a pivotable trigger guard with said trigger contact piece further comprising:
- an outwardly facing cylindrical shape which conforms to the operator's finger's inner surface when the contact piece is in a first given position; and
- means rotatably holding said trigger contact piece in said trigger guard for rotation of said contact piece's cylindrical shape into a non-conforming position against said operator's finger's inner surface in response to said second feedback signal.

3. A hand-held controller in accordance with claim 2 and wherein:
- said trigger contact piece in response to said second feedback signal is rotatably mounted for clockwise and counter-clockwise motion in said trigger housing; and said hand-held controller's first feedback responsive means further comprises:
- means for pivotably mounting, in unison, both said trigger guard and said rotatably mounted trigger contact piece therein for pivotal movement of both as a single unit.

4. A hand-held controller in accordance with claim 3 wherein said first feedback responsive means further comprises:
- means for receiving said first electrical feedback signal; and
- means translating said first electrical feedback signal into a mechanical pivotable movement of said trigger guard and said trigger contact piece as a single unit about said pivotable mounting means.

5. A hand-held controller in accordance with claim 2 wherein said trigger guard forms the finger-sized opening in said housing and further comprises:
- an outer curved section shaped to generally conform to the operator's outer finger surface when the operator's finger is received within said trigger guard; and
- said hand-held controller's second feedback responsive means further comprises:
- means for pivotably mounting, in unison, both said trigger guard and said rotatably mounted trigger contact piece therein for pivotal movement of both as a single unit.

6. A hand-held controller in accordance with claim 3 wherein said second feedback responsive means further comprises:
- means for receiving said second electrical feedback signal; and
- means for translating said second electrical feedback signal into a rotational movement of said trigger contact piece in said trigger guard.

* * * * *